March 11, 1930.    W. W. VOSPER    1,749,861
PIPE CUTTER
Filed March 25, 1927    2 Sheets-Sheet 1
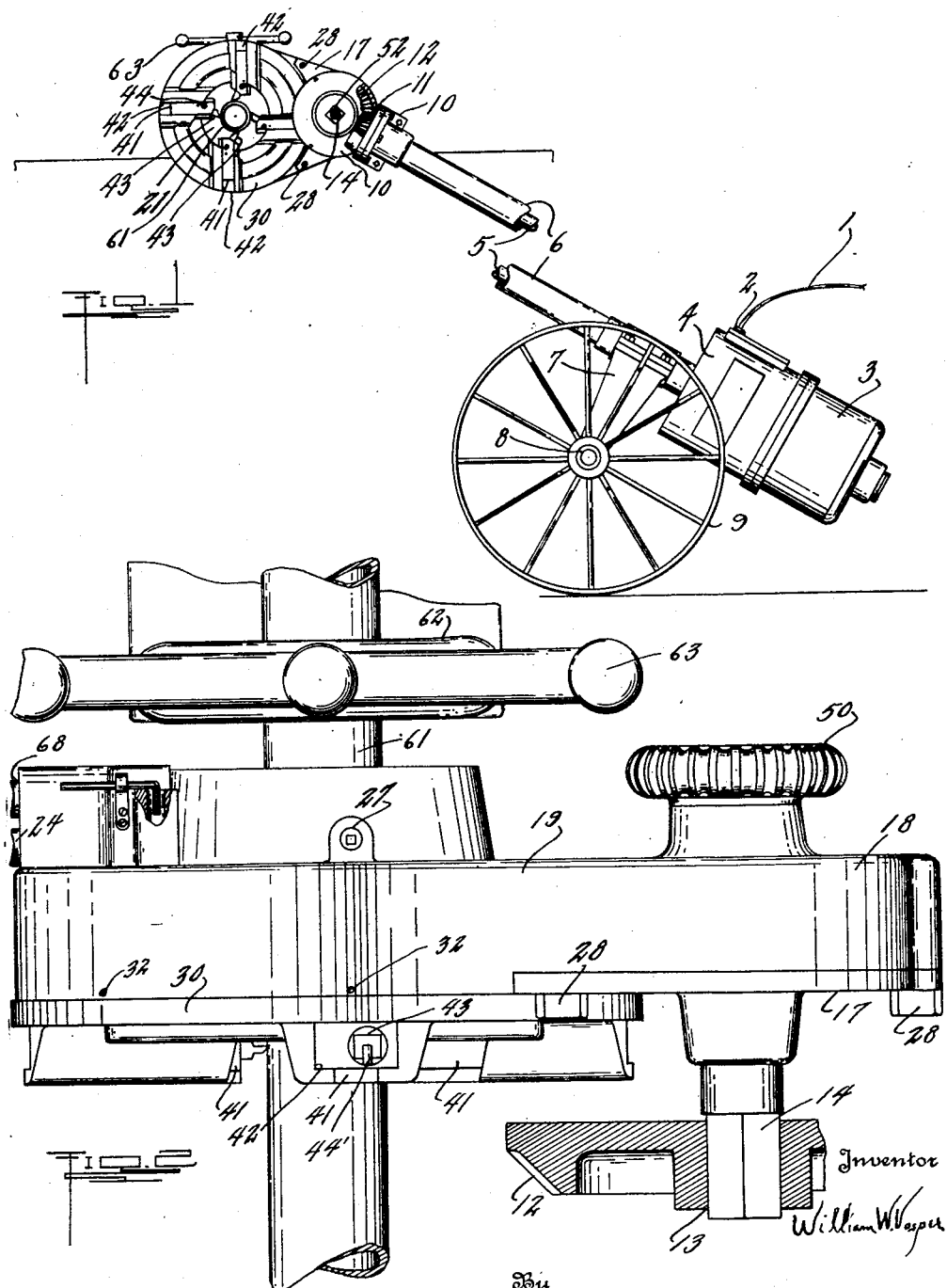
Inventor
William W. Vosper
By
Geo E Kirk Attorney

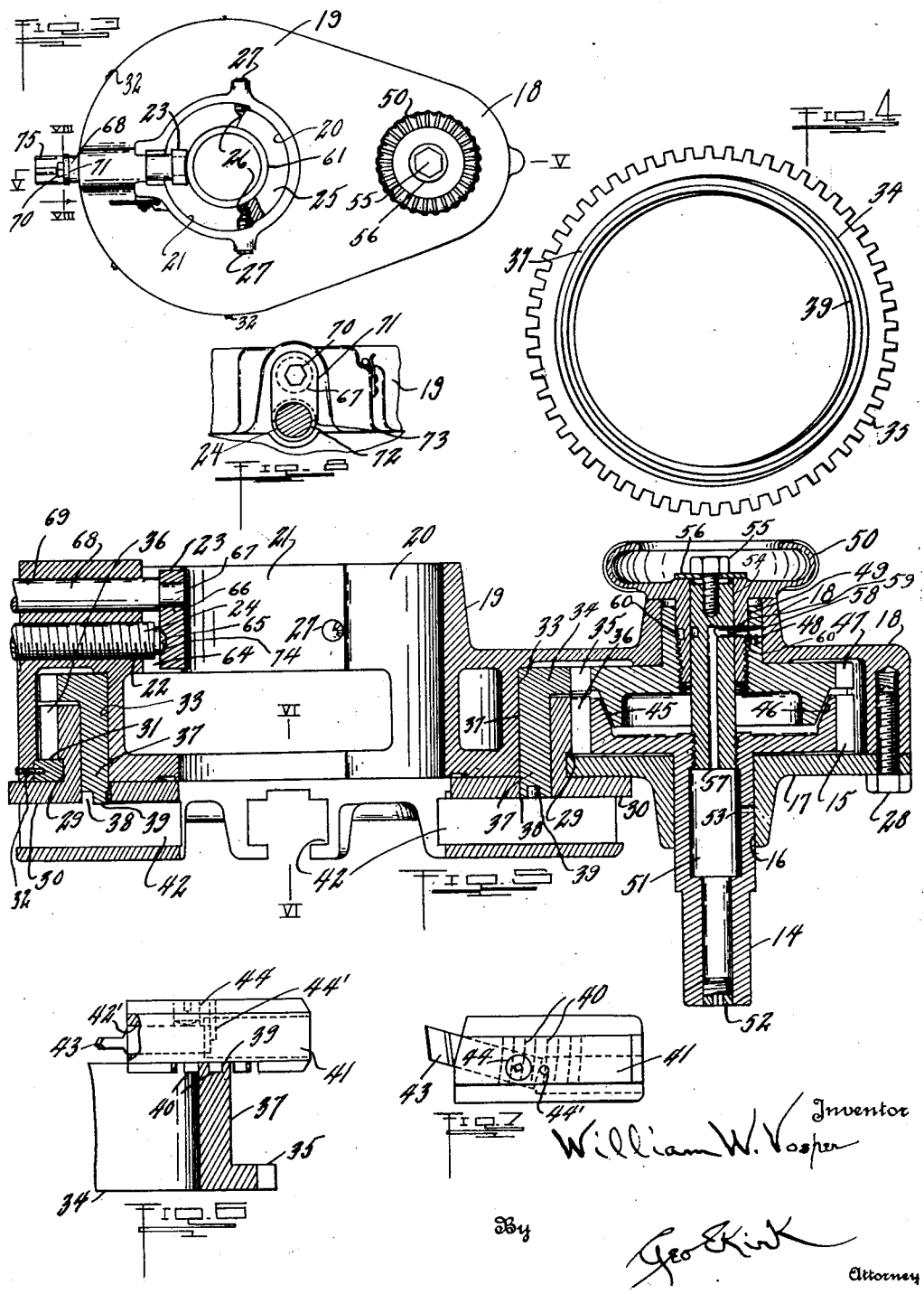

Patented Mar. 11, 1930

1,749,861

UNITED STATES PATENT OFFICE

WILLIAM W. VOSPER, OF TOLEDO, OHIO, ASSIGNOR TO THE TOLEDO PIPE THREADING MACHINE CO., OF TOLEDO, OHIO, A CORPORATION OF OHIO

PIPE CUTTER

Application filed March 25, 1927. Serial No. 178,227.

This invention relates to operating rotary tools.

This invention has utility when embodied in power actuable pipe cutters, especially for automatically feeding the cutters into the work.

Referring to the drawings:

Fig. 1 is a side elevation, with parts broken away, showing an embodiment of the invention in a pipe cutter;

Fig. 2 is a fragmentary plan view on an enlarged scale of the cutter of Fig. 1;

Fig. 3 is a view from the rear or opposite side of the cutter proper of Fig. 1;

Fig. 4 is a detail view in side elevation of the cutter feeding member or scroll;

Fig. 5 is a section on the line V—V, Fig. 3;

Fig. 6 is a section on the line VI—VI, Fig. 5;

Fig. 7 is a view looking into the cutter block as mounting a cutter; and

Fig. 8 is a view on the line VIII—VIII, Fig. 3.

An electric current supply line 1 may extend to a terminal 2 for operating a motor 3 effective through a transmission gearing in a housing 4 for rotating a shaft 5 herein shown as mounted in a sleeve 6 carried by a bracket 7 upon an axle 8 having truck wheels 9. This shaft 5, remote from the motor 3, carries a housing 10 in which is mounted a bevel pinion 11 in mesh with a bevel pinion 12 having a polygonal central opening 13 as a rotary drive transmission for a slip engagement upon a key extension 14 having fast therewith a gear 15 mounted in a bearing 16 carried by a plate 17 from an extension 18 of a frame 19. This frame 19 has a major arc member or seat 20 of a reduced diameter and coaxial with an opening 21. Opposite to this seat 20 is a threaded way 22 from which may be operated a minor arc member or jaw 23 adjacent to the plane of the gear 15 as in the frame 19. This jaw 23 is adjusted into clamping position upon the work or pipe through the operation of a screw 24 in the way 22. This device may, as to its clamp, be adapted to operate on the various sizes of work. For instance, the opening 21 may be of clearance for the handling of four inch pipe and the tool may be effective for the handling of two inch and three inch pipe as well. To such end, upon the arc seat 20 may be placed a bushing 25 (Fig. 3) having slightly recessed ends 26 into which set screws 27 may be thrust for anchoring this bushing 25.

It is accordingly seen that whether or not there be a bushing for the desired size of a pipe or the piece of the work be that of the dimension of the opening 21, a single operating means in the form of the set screw 24 may center the frame 19 as to the work in a firmly clamped position.

The plate 17 is anchored to the extension 18 of the frame 19 by bolts 28. This mounts the plate 17 so that a portion thereof enters a groove 29 on a cutter carrier 30. The arc section 31 is positioned in the plane of the plate 17 by set screws 32.

The frame 19 provides, exterior of the clamp in the plane of the gear 15, an external bearing 33 for a member 34 having an annular series of teeth 35 of the pitch diameter of an annular series of teeth 36 for the cutter carrier 30. This cutter carrier 30 is disposed exterior to a sleeve portion or a bearing of the member 34. The assembly of this gear member 35 with the gear 36 as coaxial and as a unit, upon the bearing of the frame 19, is thus completed by the anchoring of the arc section 31 as held by the set screws 32 and the plate 17.

The member 34 mounts a spiral feed cam 39 for the cutters. A sleeve portion 37 of the member 34 extends through an annular opening 38 in the carrier 30 and is there provided with a scroll 39 coacting with teeth 40 on blocks 41 disposed in radial ways 42 (Figs. 1, 2, 5,) offset and parallel to radii of the opening 21 in the frame 19. Each of these blocks 41 has an opening 42' (Fig. 6) therein as a way for mounting the blade or cutter 43. This cutter proper 43 is held in an anchored position in the block 41 by a set screw 44, after such blade 43 is in abutting relation to a pin 44' having driving fit assembly in the block.

The gear 15 is provided with an internal overhanging clutch face 45. This clutch face 45 protrudes laterally inward from the plane of the upper side of the gear 15. Opposing this cone clutch face 45 is a cone clutch member 46 of a gear 47 mounted in a bearing 48 of the frame extension 18 and axially aligned with the bearing 16. These bearings 16, 48, have a common axis which is parallel to the common axis for the gears 35, 36. Fixed with the gear 47 by an adjustable screw thread connection is a sleeve 49 having a hand wheel terminus 50 remote from the key portion 14.

This key portion 14 has a lubricant reservoir 51 in its extension portion through the bearing 16. A removable plug 52 permits the charging with grease of this reservoir 51 which grease may ooze therefrom by way of an opening 53 to lubricate the bearing 16. A stub shaft extension 54 anchored with this key portion 14 in the region of the gear 15 by a threaded assembly, terminally carries coaxially of the hand wheel 50, a bolt 55 with a plate 56 for thereby holding this wheel 50 and the gear 47 as a swivel mounting in the housing frame extension 18. From the lubricant chamber 51, a duct 57 through this stub shaft 54 extends to a radial duct 58 in communication with a lateral lubricant way 59 and an annular lubricant way 60 for lubricating the bearing 48 as well as the bearing between the sleeve 49 and the gear 47.

The gear 47 is in mesh with the scroll carrier or the feed member 34 for the cutters. The frictional resistance between the gears 47, 35, is such that the hand wheel 50 may be rotated without rotating the gears 35, 36, in one way for effecting a clutching action between the clutch face members 45, 46, for a power drive transmission connection as supplied by the pinion 12. A reverse operation will effect a releasing of this clutch so that there is only the power drive transmission effective for rotating the cutter carrier 30.

The gears 15, 47, are of approximately the same pitch diameter. However, the teeth coact for a differential transmission to the end that there may be a slow feed operation of the member 34 for a rotation relatively to the carrier 30 to thus effect an inward movement of the cutters into the work during the rotary cutter operation of the cutters and this may occur automatically.

The friction clutch transmission allows a slippage in the event there is an excess resistance and there is thus avoided any jamming of the cutters. In the instance taken, there is a two to one speed reduction between the gear 47 and the gear 35. The tooth ratio taken is the twenty-eight teeth on the gear 47 to the fifty-six teeth on the gear 35. Likewise the gear 36 is provided with the fifty-six teeth while the gear 15 is provided with the twenty-seven teeth. This relative rotation is at a reduced speed between the feed member 34, for the cutter.

The cutter carrier 30 permits the scroll 39 to be effective in its coaction with the teeth 40 of the cutter blocks in gradually shifting the cutters inward during the feed cutting operation.

The operator, when the gear 47 is unclutched from the gear 15, may grasp the walls of the ways 42 and rotate the cutter carrier 30 normally to effect a direct or a high speed inward feed of the dies to approximately the region for commencing a cutting operation, before the drive is connected or even with the drive connected.

The cutter carrier 30 may be manually operated to withdraw the cutters, as in a common plane, outward in such plane with the power disconnected from operating the gear 15. In the instances that the power drive is reversible, the in-and-out adjustments idle for bringing the cutters up to the work. Withdrawing the cutters out from the work may occur rapidly with the gear 47 unclutched from the gear 15.

In the normal feeding operation with the clutch 45, 46, in a transmission assembly, the power drive at the key 14 is effective for a rapid rotation of the cutter carrier 30 with each successive cutter to enter the work deeper than its predecessor and in a common plane for cutter action upon the work, as a pipe 61 held by a vise 62 operated from a hand lever 63.

The concave face jaw 23 may be receded into a seat 64 in the frame 19. This jaw 23 has in alignment with the threaded way 22 a seat 65. Additionally this jaw carries a seat 66 having a pressed seat assembly with an extension 67 of a stem 68 disposed in a way 69 in the frame 19 parallel to the threaded way 22. This stem 68 has a screw 70 mounting an extension 71 therewith to ride in a groove 72 of a threaded member 24 as mounted in the threaded way 22. This screw or threaded member 24 has a terminus 74 to engage the seat 65 of the jaw 23. A key end 75 of this member 24 may serve to adjust such member axially and thereby operate to thrust the jaw 23 into a gripping engagement with the work as disposed in the frame 19 towards the bushing 25. To release this device or clamp from a holding position of the work, a reverse operation of the member 24 away from the thrusting of the jaw 23 brings about a simultaneous pulling back of the jaw 23 to the action of the stem 69 as withdrawn in this outward movement of the member 24.

The plane of the cutting of the pipe 61 is a perpendicular to the axis of such pipe and is a perpendicular to the plane of the gears. For this operation the frame 19 is held fixed with the pipe 61 by the clamp for clamping it approximately in the plane of the transmission from the extension 18 to the gears 35, 36, as coaxial with the pipe 61. The pipe accordingly serves as a mounting for this cutter.

The cutter is thus readily portable, may be placed upon a pipe even as assembled in a structure. The location of the cutter may be at any desired position along the pipe with the drive or extension 18 at any angle. The normal adjustments or settings for the clamp and for the clutch are on the opposite sides from the drive transmission and the automatic feeding for the cutters.

In the operation of the device hereunder, the frame 19 is placed in a position about the pipe 61 to be cut, the location of the position being such as to bring the plane of the cutters 43 at the line for a cutting off of the pipe 61. At this location of the pipe as held by the vise 63, the frame 19 is locked. This frame 19 is provided with the major arc seat member 25 of the approximate arc contour according to the size of the pipe 61. This frame 19 opposing this arc clamping member 25 is provided with the gripping jaw 23 directed for straight line travel by the stem 68.

To effect the anchoring of this frame 19 at the determined position for the cutting and against shifting relatively to the pipe 61, a wrench may be applied to the polygonal end 75 of the set screw 24 in positively shifting the jaw 23 as directed by the pin 68 into effective clamping position for the frame 19 on the pipe 61.

The power tool truck having the wheels 9 may be brought into position, and the gear 12 positioned on the polygonal extension 14. With the power turned on for the motor 3, the power drive may effect a quick working inward of the cutters 43 by a direct drive from the gear 15 to the carrier gear 36. This direct drive is not through the gears 47, 35, but occurs when the gear 35 is unclutched at the clutch region 45, 46. As the cutters 43 are thus quickly brought to the periphery of the pipe, the hand wheel 50 may be operated to set the clutch 45, 46, thereby propelling the carrier sleeve 37 positively.

The positive propulsion of the carrier sleeve 37 with the cutter carrier 30 materially reduces the inward travel of the cutters 43, due to the differential pitch between the gears. There is thus during this cutting operation a slow inward feed for the cutters.

When the cutting off operation has been completed, the power drive 3 may be reversed and the hand wheel 50 effect unclutching. This means a high speed quick withdrawal of the cutters, and the device is in condition for repetition of this cycle of operations by working back the set screw 24, for a resetting of the frame 19.

What is claimed and it is desired to secure by Letters Patent is:

1. A pipe tool embodying a pipe embracing frame as a mounting for the tool, said frame having an arm, a pair of gears housed in said arm, a driving connection to one side of said gears, there being clutch connection between said gears, a control for said clutch connection from the opposite side of the arm from said drive connection, said frame providing a bearing radially of the gears and therealong, a cutter carrier clear of said bearing and engaging one of said gears, and a cutter actuator on the bearing and providing a bearing carrying the carrier, said cutter actuator being in mesh with the other gear and extending past the carrier engaged gear and maintained clear thereof by the carrier as therebetween.

2. A pipe tool embodying a pipe embracing frame as a mounting for the tool, said frame having an arm, a pair of gears housed in said arm, a driving connection to one side of said gears, there being clutch connection between said gears, a control for said clutch connection from the opposite side of the arm for said drive connection, a sectional plate anchored to said frame, said frame providing a bearing radially of the gears and therealong, and a pair of driven members separately in mesh with the respective gears, extending through the plate, and assembled thereby with the frame, one of said members being about the other as on the bearing.

In witness whereof I affix my signature.

WILLIAM W. VOSPER.